(12) United States Patent
Williams

(10) Patent No.: US 7,928,605 B2
(45) Date of Patent: Apr. 19, 2011

(54) ELECTRICAL POWER SUPPLY ARRANGEMENT FOR A DOWNHOLE MEASUREMENT ASSEMBLY

(75) Inventor: Percival F Williams, Cheltenham (GB)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 12/472,152

(22) Filed: May 26, 2009

(65) Prior Publication Data

US 2009/0243399 A1    Oct. 1, 2009

Related U.S. Application Data

(63) Continuation of application No. 10/546,056, filed as application No. PCT/GB2004/000629 on Feb. 18, 2004, now abandoned.

(30) Foreign Application Priority Data

Feb. 19, 2003  (GB) .................................... 0303875.9

(51) Int. Cl.
*H02M 3/06* (2006.01)
(52) U.S. Cl. ...................................................... 307/109
(58) Field of Classification Search .................... 307/109
See application file for complete search history.

(56) References Cited

U.S. PATENT DOCUMENTS

| 3,459,956 | A |   | 8/1969 | Brock |
| 3,596,369 | A | * | 8/1971 | Dickerson et al. ............. 363/85 |
| 5,187,421 | A |   | 2/1993 | Naito |
| 5,596,489 | A |   | 1/1997 | Bazes |
| 5,744,877 | A |   | 4/1998 | Owens |
| 6,088,294 | A |   | 7/2000 | Leggett, III et al. |
| 6,300,844 | B1 |  | 10/2001 | Sanner |
| 6,392,317 | B1 |  | 5/2002 | Hall et al. |
| 2006/0232138 | A1 | | 10/2006 | Williams |

FOREIGN PATENT DOCUMENTS

EP    0386261 A1    9/1990

OTHER PUBLICATIONS

"International Application Serial No. PCT/GB2004/000629, International Search Report mailed Aug. 30, 2004", 2 pgs.
"International Application Serial No. PCT/GB2004/000629, Written Opinion mailed Aug. 30, 2004", 3 pgs.

* cited by examiner

*Primary Examiner* — Hal I Kaplan
(74) *Attorney, Agent, or Firm* — Schwegman, Lundberg & Woessner, P.A.

(57) ABSTRACT

A downhole measurement assembly comprising a metal casing housing a plurality of tool sections, one of which includes a detector sensitive to a magnetic field, and a DC power supply for said tool sections, the power supply and the tool sections being electrically connected to the casing, characterised in that the power supply is connected to at least one tool section via a switching circuit and a conductor arrangement, the switching circuit comprising a capacitor, a plurality of switches and control means operative alternately to charge the capacitor from the DC supply and discharge the capacitor through said at least one tool section using the conductor arrangement so as to inhibit the generation of an electromagnetic field in the conductor arrangement between the capacitor and the said at least one tool.

19 Claims, 5 Drawing Sheets

ELECTRICAL POWER SUPPLY ARRANGEMENT FOR A DOWNHOLE MEASUREMENT ASSEMBLY

This application is a continuation of U.S. patent application Ser. No. 10/546,056, filed on Aug. 18, 2005, now abandoned which was a U.S. National Stage Filing under 35 U.S.C. 371 from International Application Number PCT/GB2004/000629, filed Feb. 18, 2004 and published in English as WO 2004/075369 A2 on Sep. 2, 2004, which claims the benefit of United Kingdom Application Serial Number 0303875.9, filed Feb. 19, 2003, which applications and publication are incorporated herein by reference in their entirety.

The present invention relates to downhole measurement assemblies and more particularly to the electrical power supply arrangement for such assemblies.

The oil and gas industry employs a variety of information gathering downhole tools during exploration and drilling of wells. These tools provide such information as hole inclination and azimuth, temperature, radioactivity, or resistivity. These tools are encased in non-magnetic stainless steel cylindrical pressure cases. By their nature, these tools have a large length to diameter ratio. The number of tools that have been introduced over the years has increased. Each tool is aligned serially down the drill string, and power is connected to each in parallel on a bus, which also allows communication between the tools and the transmission of signals to the surface. Traditionally, the pressure case of each tool is grounded and is the return path for DC current. Until recently, the directional measurement tool was always the one furthest down the hole and part of the directional measurement tool is an array of fluxgate magnetometers situated at the bottom of the tool in a module known as the stack. These magnetometers respond to the earth's magnetic field. Recently, other tools have been placed below the directional package and the power required by such tools results in current flowing in wire which passes the magnetometers and which in turn generates an electromagnetic field which causes errors in the readings produced by the magnetometers.

Historically, the pressure cases of the downhole tools have always been grounded 30 and connected to the system zero volts. This means that if conventional current carrying conductors are replaced in the region of the magnetometers by say a twisted pair or a coaxial cable, but otherwise the electrical arrangements remain unaltered, the current in the two conductors of the twisted pair or coaxial cable will be unbalanced as some current will flow through the parallel path of the pressure cases. In fact, most of the current will flow through the pressure case as it is a much better conductor.

It is an object of the present invention to enable a fully grounded downhole measurement assembly to pass direct current in either direction without the current carrying conductors generating an electromagnetic field.

The present invention provides a downhole measurement assembly comprising a metal casing housing a plurality of tool sections, one of which includes a detector sensitive to a magnetic field, and a DC power supply for said tool sections, the power supply and the tool sections being electrically connected to the casing, characterised in that the power supply is connected to at least one tool section via a switching circuit and a conductor arrangement, the switching circuit comprising a capacitor, a plurality of switches and control means operative to alternately charge the capacitor from the DC supply and discharge the capacitor through said at least one tool section using the conductor arrangement so as to inhibit the generation of an electromagnetic field in the conductor arrangement between the capacitor and the said at least one tool.

In order that the present invention be more readily understood, an embodiment thereof will now be described by way of example with reference to the accompanying drawings in which.

Figure 1:
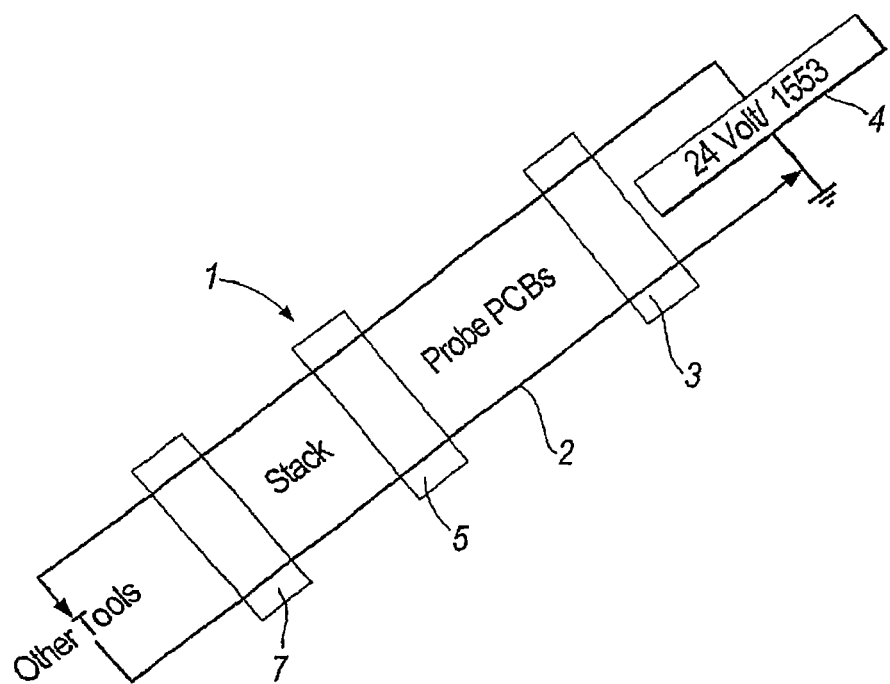
FIG. 1 is a diagrammatic representation of a downhole measurement assembly for explaining the present invention.

Referring now to FIG. 1, this shows a diagrammatic representation of a downhole measurement assembly 1 which comprises a plurality of individual tools 3 encased in non-magnetic stainless steel cylindrical pressure cases which are represented by the conductor 2 and which are mechanically and electrically connected together and also grounded. The tools 3 are supplied with DC power from a power supply 4 one side of which is also grounded. A stack 5 which includes an array of fluxgate magnetometers is located towards the bottom of the assembly 1 below the individual tools 3 but in this case other tools represented by the block 7 are shown in a position on the other side of the stack 5 from the power supply 4. This means that current for the other tools 7 has to be carried by conductors past the stack 5 and this in turn results in the generation of electromagnetic fields in the region of the stack 5 which causes in the output from the stack 5 to be inaccurate.

It has been found that simply shielding the current carrying conductor in the region of the stack 5 is not possible, as the shield itself will cause disruption of the earth's magnetic field and also, as mentioned above, simply using a twisted pair or coaxial cable is also not sufficient if one wishes to retain the basic structure of the downhole assembly utilising the grounded pressure cases of the individual tools.

The present invention proposes to use a twisted pair or coaxial cable for the current carrying conductors but which allows the pressure cases to be electrically connected together in such a manner that they carry no current. This is achieved by utilising a capacitor connected by a switching network as will be explained in relation to FIG. 2.

As in the case of FIG. 1, one side of the DC supply 4 is connected to the pressure casing 1a of the downhole measurement assembly which is in turn grounded. A capacitor 20 is connected between the poles of a two-pole electronic changeover switch which in one position of the switch accumulates charge from the supply and, when the switch is changed over to its other position, allows the capacitor to transfer its charge to one or more downhole tools which are represented by the load 24. It can be seen that although the grounds are connected, no current can flow between them. Thus, all the current delivered to the downhole tools represented by the load 24 must flow in the conductors 25 and 26 connected between the electronic changeover switch 22 and the downhole tools. These conductors 25 and 26 thus carry the same current but in opposite directions and can be a twisted pair or coaxial cable which can be routed past the magnetometers in the stack without causing electromagnetic interference. When the changeover switch position is reversed quickly, the effect is enhanced and it is preferred to reverse the switch 22 several thousand times a second.

Figure 2:
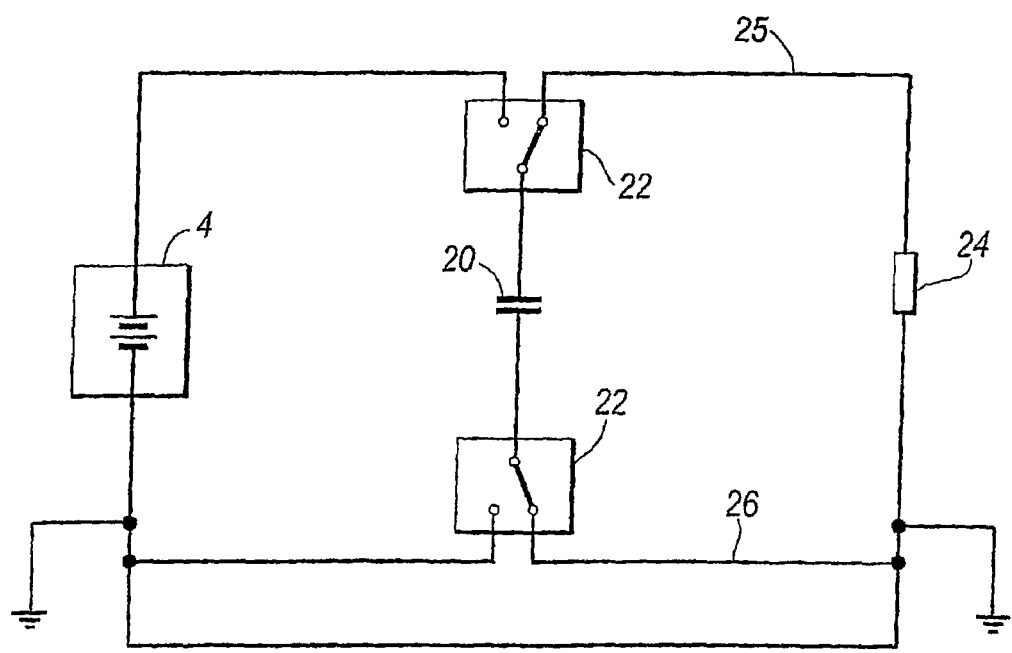
FIG. 2 shows a basic circuit diagram for explaining the principle underlying the present invention.
Figure 3:
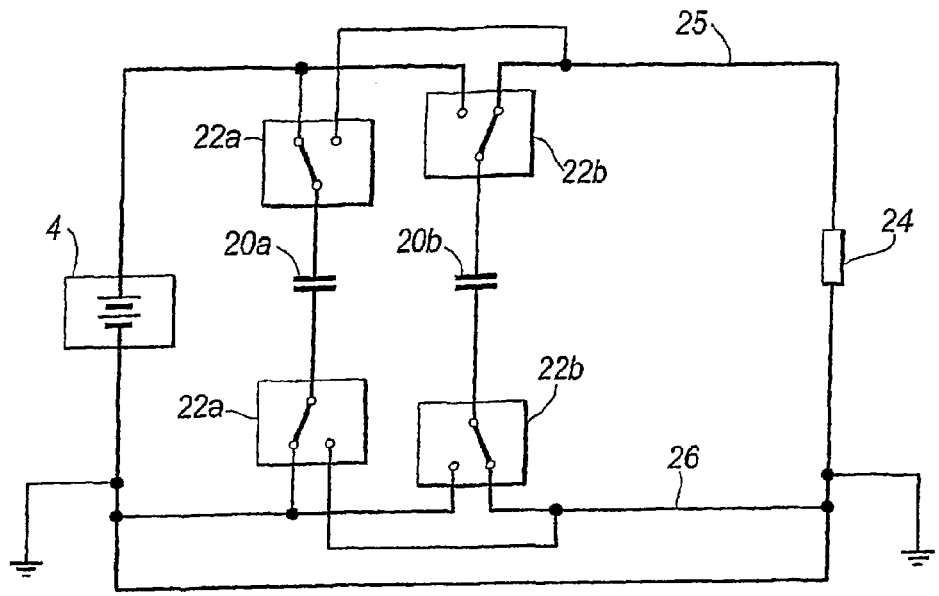
FIG. 3 shows a basic circuit diagram of a modification of the circuit shown in FIG. 2.

FIG. 3 shows an improved arrangement of the circuit shown in FIG. 2. The improved arrangement employs two capacitors 20a and 20b each provided with its own two-pole electronic changeover switch 22a and 22b respectively. With this arrangement, when one capacitor is charging, the other is discharging. This arrangement is more efficient and reduces the ripple voltage between the conductors. This is an important consideration as the conductor 25 is also used as a communications bus in many downhole tool arrangements.

Figure 4:
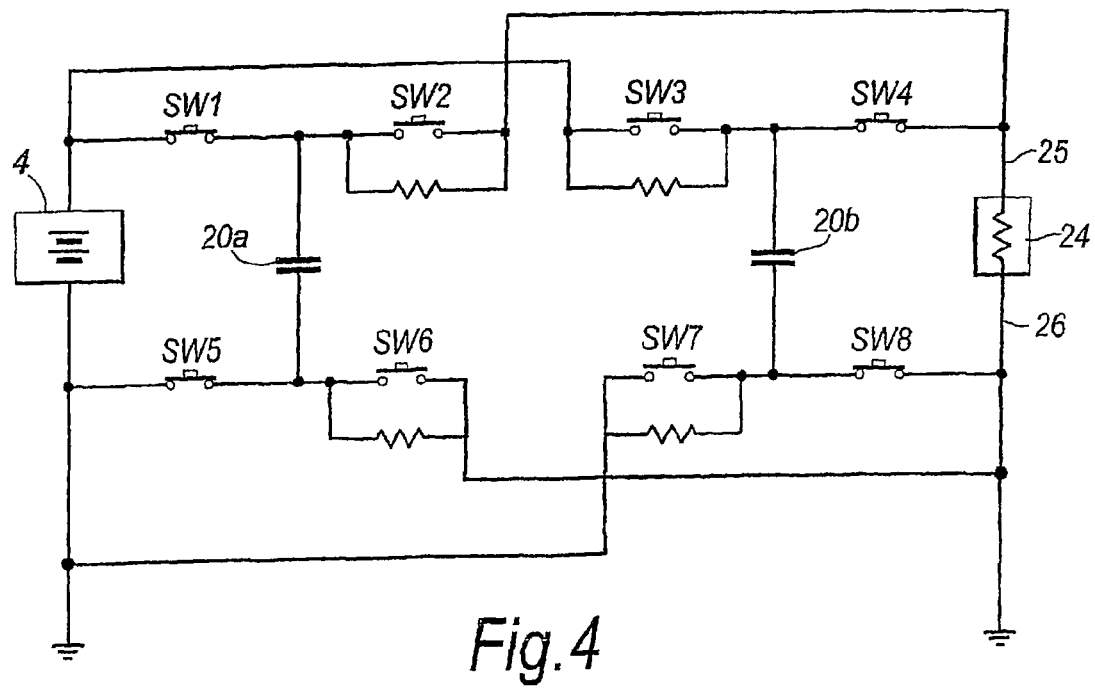
FIG. 4 shows a more detailed circuit diagram of the circuit shown in FIG. 3.

FIG. 4 shows a more practical circuit diagram of the circuit shown in FIG. 3 and in FIG. 4 the two-pole changeover switches have been replaced by semiconductor switches in the form of MOSFETs. It is preferred to use P-channel MOSFETs for switches SW1 to SW4 and N-channel MOSFETs for switches SW5 to SW8. Although it is not shown in FIG. 4, an oscillator is provided in order to drive the MOSFET switches. The positive pole of the DC power supply 4 to the capacitor 20a is via MOSFET switch SW1 when closed and the other side of capacitor 20a is connected to the negative terminal of the DC power supply 4 via the MOSFET switch SW5. In this way, capacitor 20a charges. At the same time, capacitor 20b is connected to and discharges into the load via the closed MOSFET switches SW4 and SW8. On changeover, the switches SW1, SW5, SW4, and SW8 are opened and the switches SW2, SW6 close which allows the capacitor 20a to discharge through the load while the MOSFET switches SW3 and SW7 are also closed to allow the capacitor 20b to be charged from the power supply 4.

Figure 5A:
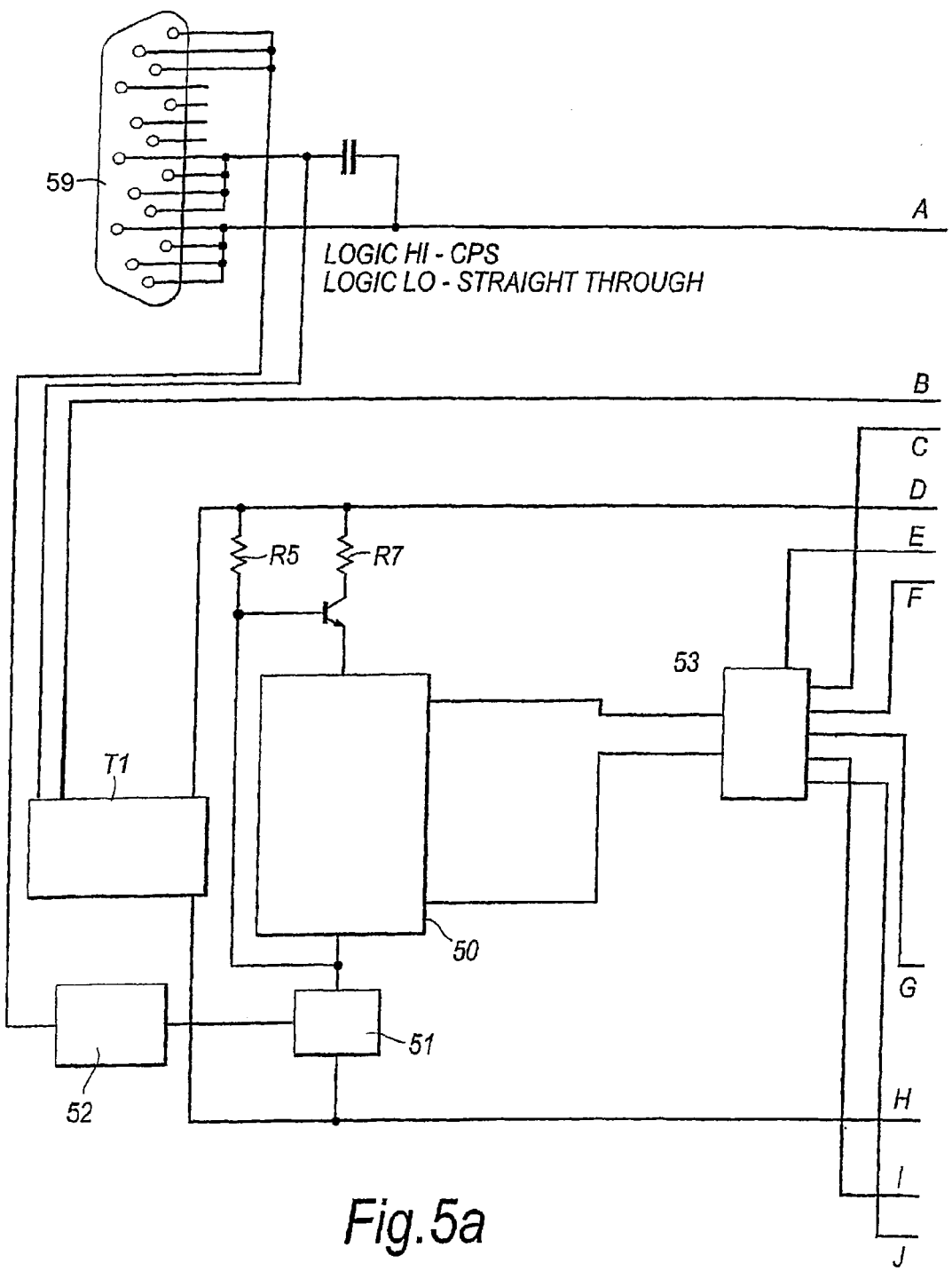
FIGS. 5a and b show a block diagram of a practical circuit of the present invention.
Figure 5B:
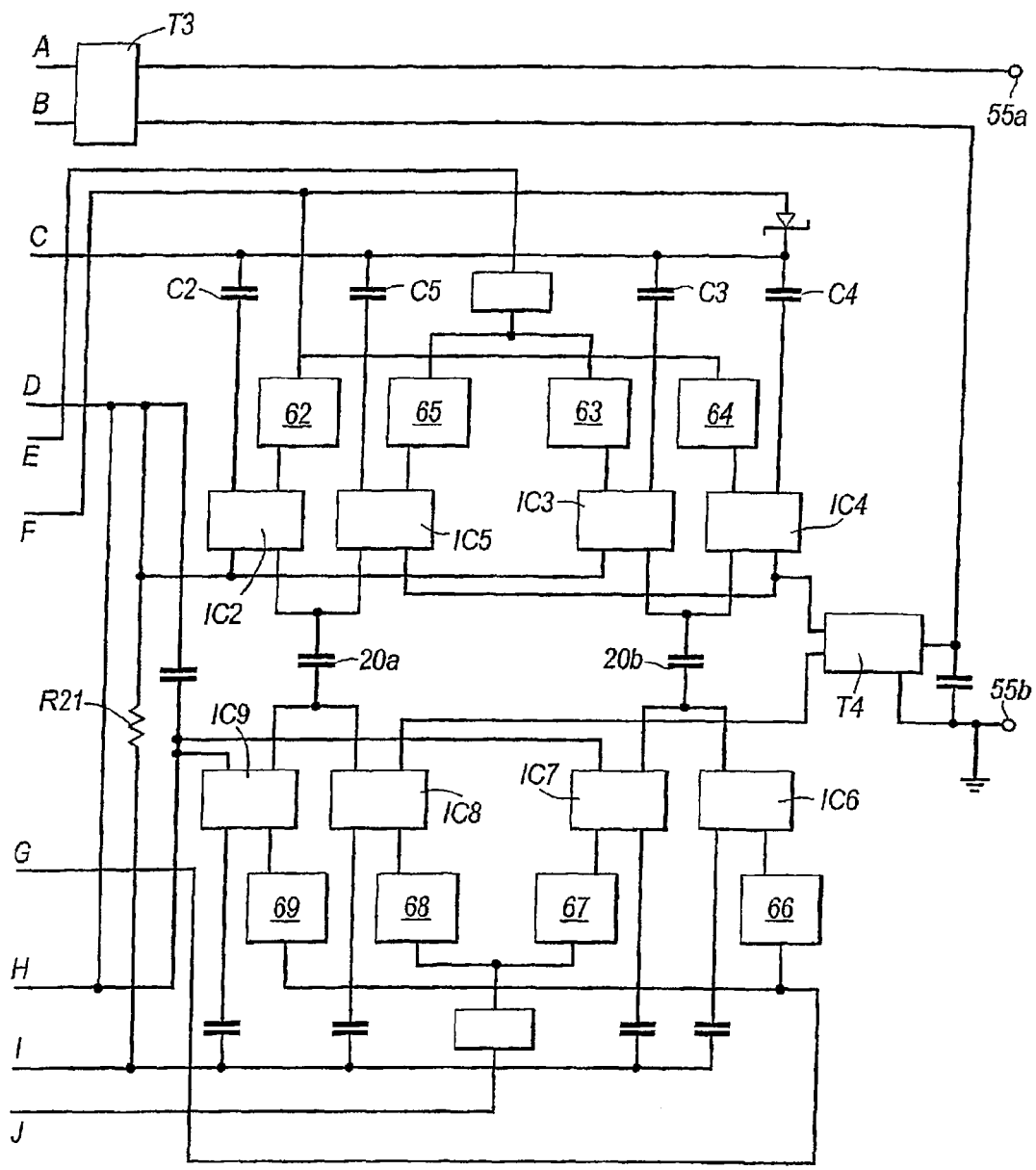

FIGS. 5a and 5b when combined at conductors A-J show a block diagram of a practical circuit diagram for implementing the arrangement shown in FIG. 4. The same component numbers and designations are used in FIGS. 5a and 5b as are used in FIG. 4 and consequently a detailed description of the operation of FIG. 5 will not be given. Suffice to say that in FIG. 5a, the oscillator is now shown and represented by the reference numeral 50. In the present example, it operates at about 53 KHz and controls the MOSFETs SW1 to SW8. The frequency is not particularly critical but operation has been found to be optimal with a frequency in the region 50 KHz to 65 KHz.

When the circuit is operating, the current taken by it is approximately 16 mA. This is due to the current required by the oscillator and amplifier and the current required to switch the MOSFETs, some of which have a gate capacitance of up to 1.5 nF. When it is merely required to pass current past the stack without the need for preventing magnetic interference, current can be saved by turning off the oscillator, in which case the upper and lower switches are short circuit. An on/off switch 51 in the form of a transistor is provided for this purpose. When a logic 1 from a control circuit 52 is applied to the gate of the transistor it is turned on and provides power to the oscillator. A logic 0 turns the transistor off and oscillation ceases.

The output of the oscillator 50 is fed to a primary winding of a transformer 53 which has two centre-tapped secondary windings. The upper secondary of the transformer 53 then simply acts as a short circuit to connect the gates of the upper MOSFETS IC2-IC5 through their networks to ground via a resistor (R21) connected to the centre tap turning them on. Similarly, the lower MOSFETs IC6-IC9 are turned on by the lower secondary.

In normal forward operation, that is with the power supply located above the tools in the downhole measurement assembly and providing current to the lower tools, current flows through transformer T3 (FIG. 5b) and inductor T1 (FIG. 5a) to R7 and R5. Should it be required for current to flow in the reverse direction, clearly the upper MOSFETs have to be turned on to provide current to R5 and R7. In the circuit shown in FIG. 5, this will always happen as the gates of the upper MOSFETs will be connected to the lower supply via R21.

The output from the circuit shown in FIG. 5 is taken from the output terminals 55a and 55b which can be suitable for connection to a twisted pair of wires or a coaxial cable.

The operational cycle is as follows:

The charging path from the positive to capacitor 20a is from an input socket 59 to transformer T3 to inductor T1 to IC2 to capacitor 20a.

The return path from the lower end of capacitor 20a is IC9 to inductor T1 to socket 59.

Capacitor 20a is charged up when the MOSFETs in IC2 and IC9 are switched on.

When capacitor 20a is charging up, capacitor 20b is discharging into the load via IC4, IC6, inductor T4 and terminals 55a and 55b.

The discharge path for capacitor 20a is via IC5, IC8, inductor T4 and terminals 55a and 55b.

When capacitor 20a is discharging, capacitor 20b is being charged.

The charge path for capacitor 20b is similar to that for capacitor 20a but via IC3 and IC7.

The transformer secondaries switch the MOSFETs on and off in the correct sequence to charge and discharge the capacitors 20a and 20b. When the gate of a P-Channel MOSFET is negative with respect to its source, then that MOSFET is turned on. The upper MOSFETs, IC2, C5, IC3 and IC4 are dual P-channel devices. When the gate of a N-Channel MOSFET is positive with respect to its source, then that MOSFET is turned on. The lower MOSFETs IC9, IC8, IC7 and IC6 are dual N-channel devices.

Consider the P-channel MOSFETs.

The output transformer 53 from the oscillator 50 has two centre tapped secondaries. One secondary controls the P-channel devices. The other secondary controls the N-channel devices. To save space, only the operation of the P-channel devices will be described.

Each of the sources is connected to the centre tap secondary through a 100 nF capacitor (C2, C5, C3 and C4). The capacitor gives DC isolation, but allows AC to pass through. If they were not there, then all the MOSFET sources would be connected together, rendering the circuit non-operational.

The upper half of the top secondary winding drives the gates of IC5 and IC3, while the lower half of the top secondary winding drives the gates of IC2 and IC4.

The gate drive to the MOSFETs is via drive circuits 62-69 each of which consists of a diode and resistor connected in parallel. The components compensate for a difference between the turn-on and turn-off delays in the MOSFETs. These delays, were they to occur, would mean that some MOSFETs are turned on for a short time when they should be turned off. The effect would be a small amount of ground current resulting in an imbalance in the currents in the twisted pair or co-axial cable.

This circuit has been designed to operate over a wide temperature range up to 165° C. and has been found to perform satisfactorily.

Figure 6:
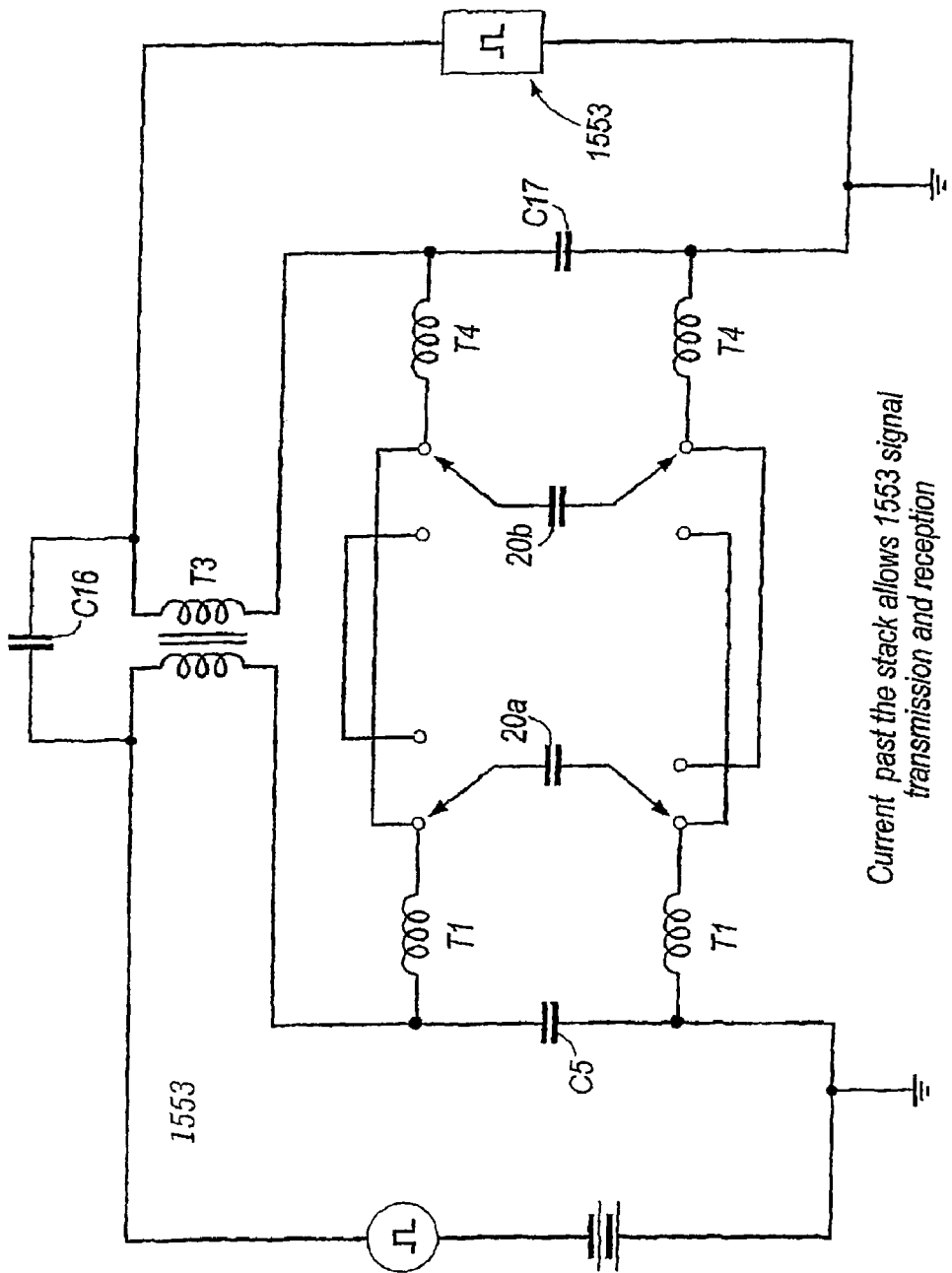
FIG. 6 shows a more detailed circuit diagram of the circuit shown if FIG. 4.

It is known that power may be passed up and down a downhole tool so as to allow communication between the tools and transmission of signals to the surface. The present invention preferably utilises the 1553 signal transmission and reception to supply power throughout the tool. However it will be appreciated that other communication standards may be utilised. FIG. 6 is a more detailed arrangement of the circuit shown in FIG. 4 and indicates the signal communication through the circuit.

The type of communication we are dealing with is where a signal is superimposed on the supply line. It is fed into transmitter/receivers through a transformer. Referring to FIG. 6, C5 and C17 act as reservoir capacitors, which in conjunction with the inductors T1 and T4, reduce the switching spikes and ripple. The main path for the communication is via C16. A parallel and very necessary path is between the two windings of T3. This wound component acts as both a transformer for communications and also as a dual choke to further reduce the switching spikes and ripple. The two windings of T1 share the same core, but T1 is not a transformer, which is why the two windings are shown separate from each other. The same applies to T4. The core shared by the two windings of each inductor has been omitted from the figure for clarity purposes. The reason for sharing the same core is that the net dc flux is zero due to cancellation. This enables the size of the component to be kept small and prevents saturation, particularly at high temperature.

The invention claimed is:

1. A downhole tool assembly, comprising:
   a plurality of casing sections forming a casing assembly, the casing sections electrically coupled to one another;
   a plurality of tools within the casing assembly that are electrically coupled to the casing assembly, the plurality of tools including at least a first tool sensitive to a magnetic field, and having at least a second tool disposed on a first side of the first tool;
   a DC power supply within the casing assembly and having a first polarity of the power supply coupled to each tool of the plurality of tools, the power supply disposed on the second side of the first tool;
   a switching circuit having an input coupled to the DC power supply, and an output, the switching circuit comprising,
      a first capacitor,
      a plurality of switches, at least two of the switches coupled to the capacitor, and
      a controller coupled to control the switches, the controller operative to control the switches to alternately charge the first capacitor from the power supply and discharge the first capacitor to first and second switching circuit output terminals; and
   a conductor arrangement comprising at least two conductors, and extending between the switching circuit first and second output terminals, past the first tool, to the second tool.

2. The assembly of claim 1, wherein the switches comprise a plurality of electrically controlled switches.

3. The assembly of claim 2, wherein the electrically controlled switches comprise MOSFETs.

4. The assembly of claim 3, wherein the controller further comprises an oscillator coupled to control switching of the MOSFETs.

5. The assembly of claim 4, wherein the oscillator operates in the range of 50-60 Hz.

6. The assembly of claim 2, wherein the switching circuit further comprises a second capacitor, the second capacitor coupled to at least two switches of the plurality of switches; and wherein the controller is further operative to charge the second capacitor while the first capacitor is discharged to the first and second switching circuit output terminals.

7. The assembly of claim 1 wherein the conductor arrangement comprises at least one of a twisted pair of conductors and a coaxial conductor pair.

8. A downhole tool assembly, comprising:
   a plurality of casing sections forming a casing assembly, the casing sections electrically coupled to one another;
   a plurality of tools within the casing assembly that are electrically coupled to the casing assembly, the plurality of tools including at least a first tool sensitive to a magnetic field, and having at least a second tool disposed on a first side of the first tool;
   a DC power supply within the casing assembly and coupled to the casing assembly where the casing provides a first conductive path between the DC power supply and each tool of the plurality of tools;
   a switching circuit having an input coupled to the DC power supply, and an output, the switching circuit comprising,
      a first capacitor,
      a plurality of switches, and
      a controller coupled to control the switches to alternately connect the first capacitor across the DC power supply to charge the capacitor from the power supply, and to disconnect the first capacitor from the DC power supply and connect it across second and third conductive paths extending to at least the second tool to discharge the first capacitor through the second and third conductive paths to provide power to the second tool; and
   a conductor arrangement comprising at least two conductors, and wherein the conductor arrangement forms at least a portion of the second and third conductive paths.

9. The downhole tool assembly of claim 8, wherein the plurality of switches comprises at least third and fourth switches, with the third switch in the second conductive path and the fourth switch in the third conductive path.

10. The downhole tool assembly of claim 9, further comprising a second capacitor, and wherein the third and fourth switches are coupled to the second capacitor and wherein the controller is operative to alternately connect the second capacitor across the DC power supply to charge the capacitor from the power supply while the first capacitor is discharging, and to disconnect the second capacitor from the DC power supply and to connect it across the second and third conductive paths to discharge the second capacitor through the second and third conductive paths to power to provide power to the second tool while the first capacitor is charging.

11. The assembly of claim 8, wherein the switches comprise a plurality of electrically controlled switches.

12. The assembly of claim 10, wherein the electrically controlled switches comprise MOSFETs.

13. The assembly of claim 12, wherein the controller further comprises an oscillator coupled to control switching of the MOSFETs.

14. The assembly of claim 8, wherein the controller comprises an oscillator operating in the range of 50-60 Hz.

15. The assembly of claim 8, wherein the DC power supply is on a second side of the first tool, and wherein the conductor arrangement extends past the first tool to the second tool.

16. A method of applying power in a downhole tool assembly comprising a DC power supply electrically coupled through a casing assembly wherein one side of the DC power supply and a plurality of tools in the downhole tool assembly are all coupled to a common ground though the casing assembly, the method comprising the acts of:
   actuating a switching assembly to repeatedly,
      charge a capacitor in the downhole tool assembly from the DC power supply,
      disconnect the capacitor from the DC power supply, and connect the capacitor to second and third conductive paths coupled to at least one tool of the plurality of tools, to discharge the capacitor and provide power to the at least one tool.

17. The method of claim 16, wherein the downhole tool assembly comprises a plurality of capacitors arranged to be selectively coupled to the DC power supply, and wherein the act of actuating the switching assembly comprises repeatedly:

charging each capacitor in the plurality of capacitors from the DC power supply, while another capacitor is discharging;

disconnecting that charged capacitor from the DC power supply; and connecting that charged capacitor to the second and third conductive paths to discharge the capacitor and provide power to the at least one tool.

18. The assembly of claim 16, wherein the switches comprise a plurality of electrically controlled switches.

19. The assembly of claim 18, wherein the electrically controlled switches comprise MOSFETs.

* * * * *